May 1, 1962 J. M. URITIS 3,032,284

WEB REELING SYSTEM

Filed June 30, 1955 2 Sheets-Sheet 1

INVENTOR.
Joseph M. Uritis
BY
Morris L. Rabkin
ATTORNEY.

INVENTOR.
Joseph M. Uritis
BY Morris Rabkin
ATTORNEY.

United States Patent Office 3,032,284

Patented May 1, 1962

3,032,284

WEB REELING SYSTEM

Joseph M. Uritis, Haddonfield, N.J., assignor to Radio Corporation of America, a corporation of Delaware Filed June 30, 1955, Ser. No. 519,097

4 Claims. (Cl. 242—55.12)

This invention relates to web reeling systems, and more particularly to a system employing intermediate storage bins or receptacles for a web member between a web reel and a utilization device.

Magnetic recording techniques have been employed in the art relating to high speed computer systems. Data is stored as magnetic impulses on a reelable magnetic record. In such systems, the tape must frequently be driven at relatively high speeds. In order to achieve a degree of accuracy in reproducing the magnetic impulses, means must be provided whereby a tape record member can be brought up to full speed substantially instantaneously by a primary tape driving means. In order to effect the instantaneous starting and/or stopping of the tape, there must be a minimum of inertia to overcome during the starting and stopping operations. If the tape were to be pulled directly from a storage reel to the signal translating device, the inertia of the tape as well as that of the relatively massive reel must first be overcome before the tape can be brought up to the speed. In order to avoid the necessity of overcoming the inertia of the storage reels, an unsupported or loose loop of tape is provided between the transducing station and the reels. In order to confine this loose loop of tape to a relatively small area, and to avoid tangling of the tape, a bin or receptacle is provided to accommodate this loose length of tape. In such a reeling system, it is frequently desirable to have a supply reel and a takeup reel for the tape as primary storage devices. In this case, it is desirable to have a bin or receptacle for the intermediate storage of a loose loop of tape between the supply reel and the transducing station, and a second bin or receptacle for the intermediate storage of a second loop of tape between the transducing station and the takeup reel. Means must be provided for controlling and maintaining the length of the loop of tape temporarily stored in each of the storage bins.

Accordingly, it is an object of the present invention to provide an improved web reeling and feed control means.

It is another object of the present invention to provide an improved reeling system which is characterized by improved control means for controlling the quantity of tape or web stored as a loose loop in an intermediate bin.

It is a further object of the present invention to provide an improved reeling system of the type set forth wherein means are provided for effectively weighing the quantity of tape in the intermediate storage bin.

In accomplishing these and other objects, there has been provided, in accordance with the present invention, a tape reeling system wherein a quantity of tape is fed from a supply reel first to an intermediate storage bin, and then from the bin to a transducing station. From the transducing station, the tape is fed to a second intermediate storage bin and from there to a takeup reel. In each of the intermediate bins, there is provided a spring loaded, or otherwise resiliently supported, tape holding member. The resilient support for this member is so arranged that a predetermined quantity of tape will cause the tape holding member to be depressed to the point of engagement with a suitable switch. The switch is, in turn, connected in an electrical circuit to control the amount of tape being fed into or removed from the intermediate storage bins, as the case may be.

A better understanding of this invention may be had from the following detailed description when read in connection with the accompanying drawing in which.

Figure 1:
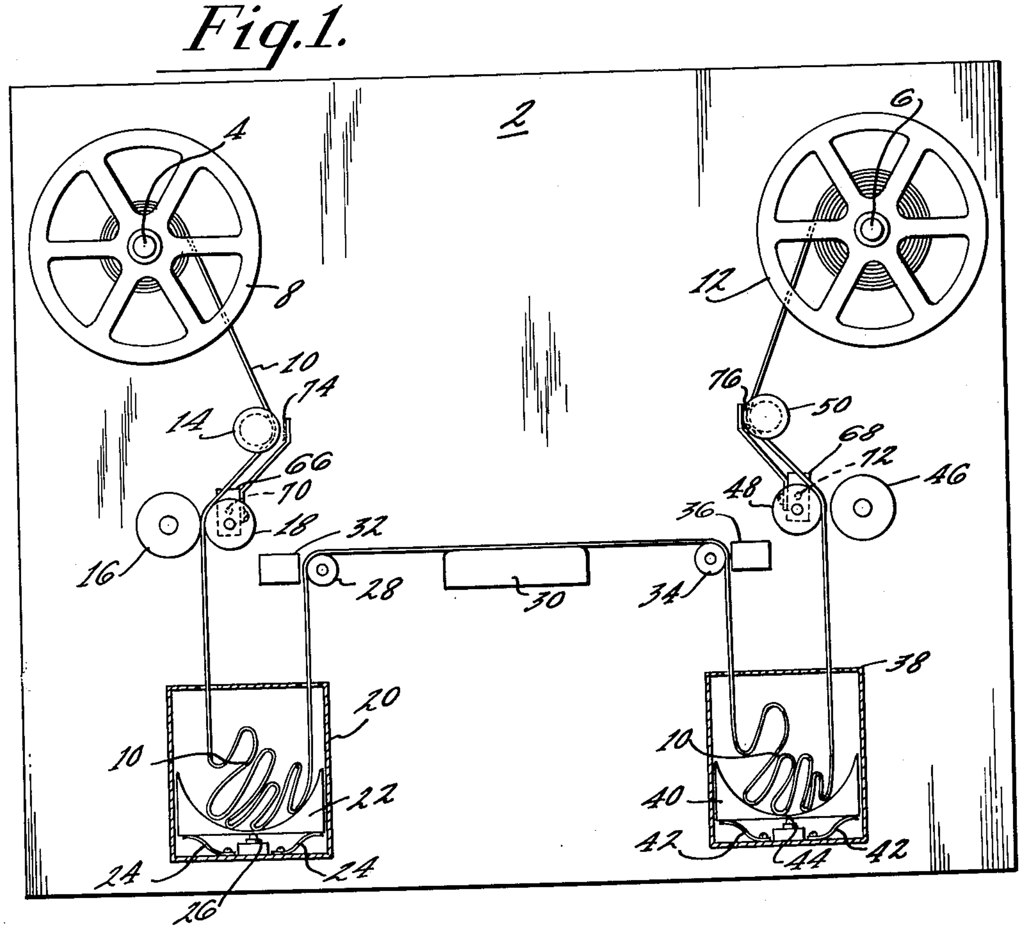
FIG. 1 is an elevational view, partly in cross section, of a tape reeling system embodying the present invention.

Referring now to the drawing in more detail, there is shown in FIG. 1 a mounting panel 2. Extending through the mounting panel 2, there is a supply reel shaft 4 and a takeup reel shaft 6. Suitably secured to the supply reel shaft, there is a supply reel 8 which carries a quantity of magnetic recording tape 10. A similar reel 12 constitutes a takeup reel and is mounted on the takeup reel shaft 6. As the tape 10 leaves the supply reel 8, it passes first over a tensioning guide post 14, and then past a driving capstan 16 together with its selectively operable pressure roller 18. This capstan and pressure roller assembly is operable to remove tape from the supply reel and feed it into an intermediate storage bin 20. The lower portion of the storage bin 20 is spanned by a resiliently supported tape holding member 22. The tape holding member 22 is supported, for example, by a pair of leaf springs 24. The upper surface of the tape holding member 22 is preferably arcuate in a concave direction. This has a tendency to prevent tape from being caught between the end of the tape holding member 22 and the edge of the bin 20.

Below the tape holding member 22, there is positioned a switching device such, for example, as a microswitch 26. This microswitch is used to control the energization of the reel driving motor, as will be more fully described hereinafter. A capstan 28 is positioned to be engaged by the tape 10 in its path from the bin 20 to a tape transducing station 30. A housing member 32 houses means for selectively effecting driving engagement between the capstan 28 and and the tape 10. A similar capstan 34 with its associated housing member 36 is positioned on the opposite side of the transducing station from the first mentioned capstan. These capstans 28 and 34 constitute the primary driving means for the web or tape. Since these capstans and their associated drive engaging means form no part of the present invention, it is felt that the schematic representation is adequate in the present case. Following the second capstan 34, there is a second bin 38 into which the tape 10 is fed for intermediate storage. As in the first bin, the lower portion of the bin 38 is spanned by a tape holding member 40. This tape holding member 40 is also resiliently supported, as by a pair of leaf springs 42. Here too, a microswitch 44 is positioned to be engaged and actuated responsive to depression of the tape holding member 40. The tape is removed from the bin 38 by the takeup reel 12, the tape passing between a capstan 46 and a pressure roller 48 and over a tensioning guide post 50.

Figure 2:
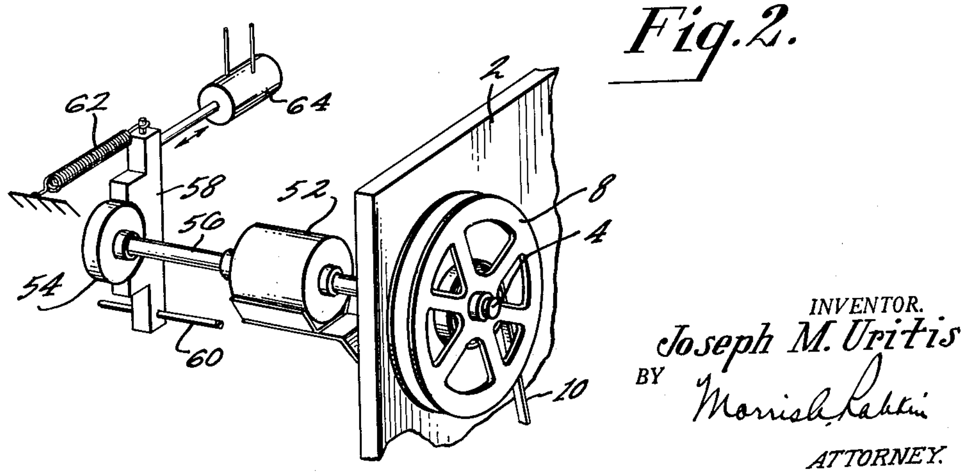
FIG. 2 is a fragmentary perspective view showing details of the reel driven mechanism.

With reference to FIG. 2, it may be seen that the reel shaft 4 is driven by a reel shaft motor 52. A brake device is provided for arresting the motion of the reel shaft. This brake device is represented as a brake drum 54 secured to the shaft 56 of the motor 52. A brake shoe 58 is positioned to engage the drum 54 and is illustrated as being pivoted about the pivot member 60. A tension spring 62 is arranged to bias the shoe into braking engagement with the drum, while a solenoid 64 is arranged, when energized, to disengage the shoe 58 from the drum 54. It will be appreciated that a similar drive arrangement is provided on the takeup reel shaft.

The operation of the capstans 16 and 46, pressure rollers 18 and 48 and tensioning guide posts 14 and 50 is more fully described in and is the subject matter of a copending application, Serial No. 463,502, filed in the name of Stavrakis and Kennedy on October 20, 1954, now Pat. No. 2,838,250 issued June 10, 1958. The capstans 16 and 46 are coupled directly to the reel driving system for the associated reels, respectively. The pressure rollers 18 and 48 are mounted, respectively, on mounting blocks 66 and 68. These blocks are pivotally carried on shafts 70 and 72 which are also coupled, through friction clutches (not shown), to the respective reel driving means. Whenever one of the reels is driven in a direction to wind tape thereonto, the mounting block is pivoted by its associated shaft so that the pressure roller 18 or 48 is disengaged from the associated capstan 16 or 46. However, the same pivoting motion which disengages the pressure roller from the capstan causes a pressure pad 74 or 76 to press the tape against the tensioning guide post 14 or 50, as the case may be, to apply sufficient back tension to the tape to assure that the tape will be wound smoothly on the reels. On the other hand, if either of the reels is driven in a direction to pay out tape, then the capstan 16 or 46 will be overdriven through a suitable sleeve (slip) clutch in a direction to pull the tape from the reel. The opposite direction of rotation of the reel also causes the block 66 or 68 to pivot to move the pressure roller 18 or 48 into engagement with the associated capstan. By the same motion, the pressure pad 74 or 76 is disengaged from its associated tensioning guide post.

The tape driving system associated with each of the reels is independent of the tape driving system associated with the other of the reels. Accordingly, circuitry such as that shown in FIG. 3 is representative of the control circuit for the reel driving system associated with each of the reels.

Figure 3:
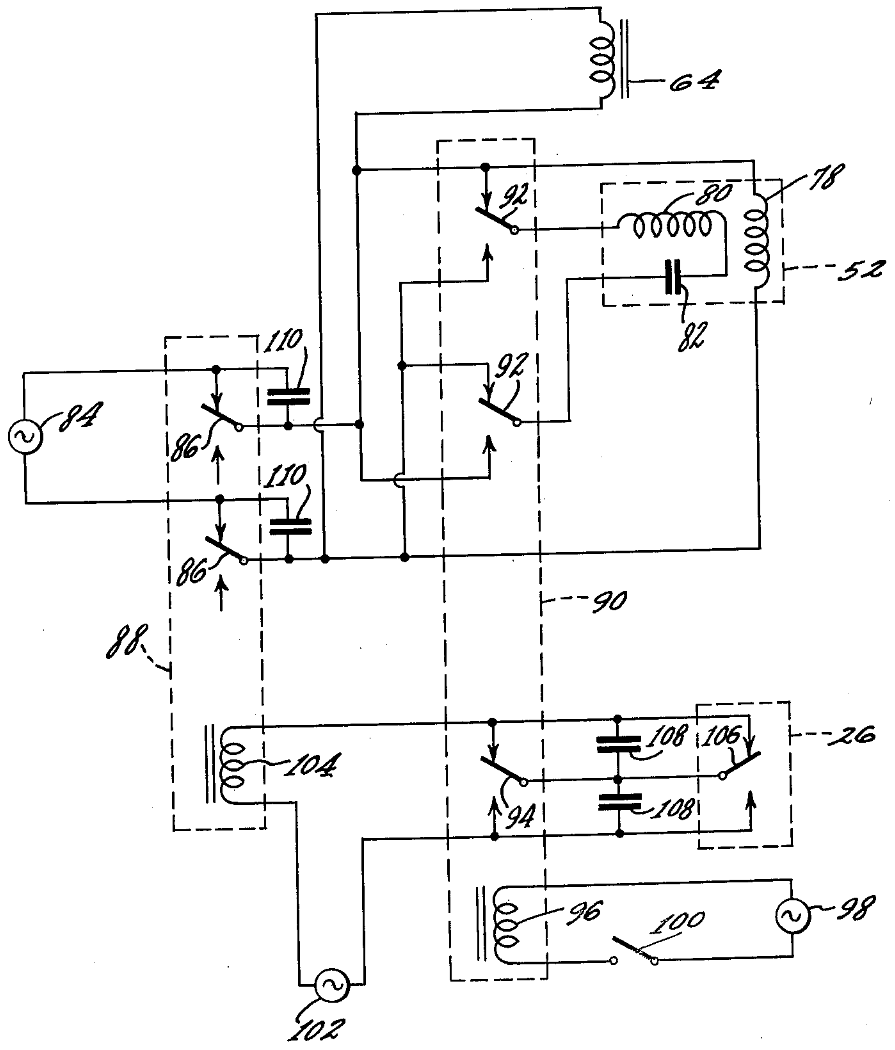
FIG. 3 is a schematic diagram of a circuit for effecting the control of the web feed in accordance with the present invention.

In the circuit diagram of FIG. 3, the reel motor 52 is represented as being a reversible motor having two field coils 78 and 80 with a phase shifting capacitor 82 coupled to one of the field coils. A source of alternating current 84 is connected through a pair of reel control switch contacts 86 on a reel motor control relay 88 to the motor 52. Connected in shunt with the motor, across the switch contacts 86, is the brake solenoid 64. Thus, whenever the switch contacts 86 are closed to energize the motor 52, the solenoid 64 is also energized to disengage the brake shoe 58 from the drum 54 on the motor shaft.

Also coupled in the motor circuit is a means for reversing the connections of the field coil 80 and the capacitor to effectively reverse the direction of rotation of the motor. This is accomplished by a motor reversing relay 90 which is provided with a pair of switch contacts 92 in the input circuit to the field coil 80, as well as a third contact 94 which is connected in a control circuit. The motor reversing relay 90 is driven by a solenoid 96 which is coupled to a source of alternating current 98 through a switch 100.

The control circuit coupled to a source of alternating current 102 includes the motor control driving solenoid 104 of the reel motor control relay 88. The circuit also includes the contact 94 of the motor reversing relay 90 and the switch contacts 106 of the microswitch 26 which is positioned in the bottom of the bin 20. A pair of small capacitors 108 is included in the circuit as a means of preventing arcing at the switches. Similar capacitors 110 are associated with the switch contacts 86 of the reel motor control relay.

Assuming the switch conditions as shown in FIG. 3, the reeling system is conditioned for paying tape off of the supply reel 8 and into the bin 20. The motor reversing relay 90 is shown in its deenergized condition, allowing the switch contact 94 to be closed on its upper contact point. Similarly, the microswitch 26 is illustrated as being in its undepressed condition, allowing the contact 106 to be closed on its upper contact point. In this condition, no current from the source 102 is applied to the solenoid 104 of the reel motor control relay 88. This permits the contacts 86 to be closed for applying current from the source 84 to energize the motor and to disengage the brake. In this condition, tape is being fed from the reel into the associated bin.

When the quantity of tape supplied to the bin is sufficiently heavy to cause the tape holding member 22 to overpower the leaf springs 24, the microswitch 26 is actuated. When the microswitch 26 is actuated, the contact member 106 is closed on the lower contact point of the switch. When this happens, alternating current from the source 102 finds a completed path through the contact member 106 of the switch 26, and then to the contact member 94 of the reversing relay and the driving solenoid 104 of the reel motor control relay 88. This actuates the relay 88, interrupting the circuit from the source 84 to the motor 52 and also to the brake solenoid 64. Interrupting this circuit shuts off the motor 52 and allows the spring 62 to cause engagement of the brake shoe 58 with the drum 54, stopping the rotation of the supply reel 8.

This condition is maintained so long as the weight of the tape in the bin is sufficient to keep the microswitch depressed. However, if sufficient tape is withdrawn from the bin by operation of the capstan 28 or 34, the tape holding member 22 will be raised by the leaf springs 24, allowing the microswitch 26 to return to its original position. This interrupts the flow of current to the motor control relay 88. The deenergization of this relay allows the circuit to be reestablished between the source of current 84 and the motor 52, causing more tape to be fed from the reel into the bin.

At this point, we may assume that the end of the tape on the supply reel has been approached. When this occurs, it is desirable to rewind the tape back onto the supply reel. To accomplish this, the reversing switch 100 is closed. This completes the circuit between the source of current 98 and the driving solenoid 96 of the reversing relay 90. When the solenoid 96 is energized, the switch contacts 92 are operated to reverse the phase relation of the current flowing through the field coil 80 with respect to that in the field coil 78. This arrangement causes the motor when energized to be operated in the reverse direction.

However, simultaneously with the operation of the switch contacts 92, the switch contact 94 in the control circuit is also operated. This causes the switch contact 94 to be closed on the lower contact point. In this arrangement, the current from the source 102 finds a completed circuit through the switch contact 94 of the reversing relay, the switch contact 106 of the microswitch 26 and the driving solenoid 104 of the reel motor control relay 88. This, of course, energizes the solenoid 104 and opens the circuit to the motor 52. When the reversing switch 100 is closed, it must be assumed that the capstan 28 or 34, as the case may be, is operated to drive the tape into the bin under consideration. When a sufficient quantity of tape has been fed into the bin from the capstan 28, for example, to cause the microswitch 26 to be depressed, the circuit to the solenoid 104 is again opened, allowing the motor 52 to be energized. In this condition, the motor drives the reel in such a direction as to remove the tape from the bin.

In the illustrative embodiment of the reeling system as herein described, the tape 10 is delivered to the transducing station 30 by the capstans 28 and 34 in response to demands made by other portions of the computing system. It is these capstans which must start and stop the tape substantially instantaneously. With this sort of operation, it will be appreciated that the tape will be fed in spurts of irregular duration. The circuit described with respect to FIG. 3 is equally applicable to either of the reel driving systems, whether it be the supply reel or the takeup reel, and, apart from the interconnection of the tape and the two capstans 28 and 34, the two tape driving systems associated respectively with the two reels are quite independent of each other. Inasmuch as the control system for each reel driving system is a function of the weight of the tape in the particular bin associated with the particular reel driving system, the control element does not depend upon the relative lengths of the two loops of tape in the intermediate storage stages.

Thus, there has been provided an improved tape reeling system which is characterized by improved control means for controlling the quantity of tape or web stored as a soft loop in an intermediate bin.

What is claimed is:

1. In a web reeling system including a first web storage reel, a second web storage reel and a primary web driving means positioned between the two reels, the combination comprising a first intermediate storage receptacle for collecting a loose loop of said web between said first storage reel and said primary web driving means, a second intermediate storage receptacle for collecting a loose loop of said web between said primary web driving means and said second storage reel, a first additional driving means for feeding said web from said first storage reel into said first receptacle, a control circuit for selectively controlling the operation of said first additional driving means, a first switch means positioned in said first receptacle, said first switch means being operative in response to a predetermined weight of said web collected in said first receptacle to control the operation of said control circuit, a second additional driving means for feeding said web from said second receptacle into said second storage reel, a second control circuit for selectively controlling the operation of said second additional driving means, and a second switch means positioned in said second receptacle, said second switch means being operative independently of said first switch means in response to a predetermined weight of said web collected in said second receptacle to control the operation of said second control circuit.

2. In a tape reeling system including means for scanning said tape, two storage reels, and two capstans disposed on opposite sides of said scanning means for driving said tape thereacross, the combination comprising a first intermediate storage receptacle for collecting a loose loop of said web between one of said capstans and one of said storage reels, a second intermediate storage receptacle for collecting a loose loop of said web between the other of said capstans and the other of said reels, two driving means for effecting the flow of said web between said storage reels and said receptacles, and different means in each of said receptacles adapted to operate at substantially predetermined weights for independently weighing said loose loops of said web collected in each of said receptacles for independeitly controlling said driving means.

3. In a web reeling system including a pair of web storage reels and a pair of primary web driving means, the combination comprising intermediate storage receptacles for collecting a loose loop of said web disposed between adjacent ones of said primary driving means and said storage reels, a pair of additional independently operative driving means for effecting the flow of said web between different ones of said storage reels and said receptacles, said additional driving means each including means for driving a different one of said storage reels and means for applying a braking force thereto, a different control circuit for each of said additional driving means, and said control circuits each including a different control element having a movable part position in said receptacles individually responsive to the weight of said web collected therein by movements in opposite directions in response to variations in weight of said collected web at substantially predetermined weights for individually controlling the energization of said control circuits.

4. In a web reeling system including a pair of storage reels and a pair of capstans, the combination comprising a first bin for collecting a loose loop of said web between one of said capstans and one of said storage reels, a second bin for collecting another loose loop of said web between the other of said capstans and the other of said storage reels, a pair of reel drive motors, each coupled to a different one of said reels for effecting the flow of said web between said storage reels and said bins, a pair of electromagnetic braking means each for stopping a different one of said motors, a pair of control circuits each for controlling the energization of one of said pair of motors and the one of said pair of braking means associated therewith, a control element coupled in one of said pair of circuits and positioned in said first bin, and a control element coupled in the other of said pair of circuits and positioned in said second bin, said elements being resiliently biased to be individually operative in response to variations in the weight of said web collected in the respective bins at substantially predetermined weights for selectively controlling said circuits.

References Cited in the file of this patent

UNITED STATES PATENTS

| | | |
|---|---|---|
| 1,912,892 | Eitzen | June 6, 1933 |
| 2,317,921 | Leach | Apr. 27, 1943 |
| 2,708,554 | Welsh et al. | May 17, 1955 |
| 2,730,309 | Baer | Jan. 10, 1956 |
| 2,733,871 | Reinhold | Feb. 7, 1956 |
| 2,792,217 | Weidenhammer et al. | May 14, 1957 |

FOREIGN PATENTS

| | | |
|---|---|---|
| 1,085,854 | France | Aug. 4, 1954 |